(12) United States Patent
Segawa

(10) Patent No.: US 8,525,384 B2
(45) Date of Patent: Sep. 3, 2013

(54) MOTOR

(75) Inventor: Noboru Segawa, Saitama (JP)

(73) Assignee: Nidec Copal Corporation, Tokyo (JP)

( * ) Notice: Subject to any disclaimer, the term of this patent is extended or adjusted under 35 U.S.C. 154(b) by 369 days.

(21) Appl. No.: 12/921,764

(22) PCT Filed: Mar. 10, 2009

(86) PCT No.: PCT/JP2009/054548
§ 371 (c)(1),
(2), (4) Date: Sep. 9, 2010

(87) PCT Pub. No.: WO2009/113540
PCT Pub. Date: Sep. 17, 2009

(65) Prior Publication Data
US 2011/0001384 A1 Jan. 6, 2011

(30) Foreign Application Priority Data

Mar. 10, 2008 (JP) ................................. 2008-060134
Mar. 10, 2008 (JP) ................................. 2008-060137

(51) Int. Cl.
*H02K 27/00* (2006.01)
(52) U.S. Cl.
USPC ......... 310/233; 310/235; 310/71; 310/154.09
(58) Field of Classification Search
USPC .............. 310/43, 71, 81, 195, 231, 233, 235, 310/154.08, 154.09
See application file for complete search history.

(56) References Cited

U.S. PATENT DOCUMENTS

| 5,327,035 | A  | * | 7/1994  | Sunaga ........................... 310/81   |
| 5,729,070 | A  | * | 3/1998  | Okuyama et al. ............. 310/235        |
| 6,208,238 | B1 | * | 3/2001  | Ohta ........................... 340/391.1   |
| 6,404,085 | B2 | * | 6/2002  | Hamaguchi et al. ............. 310/81        |
| 6,417,589 | B1 | * | 7/2002  | Kuyama et al. ................. 310/81       |
| 6,573,627 | B2 | * | 6/2003  | Sun ................................. 310/81  |
| 6,600,245 | B1 | * | 7/2003  | Yang et al. ...................... 310/71    |
| 6,661,138 | B2 | * | 12/2003 | Osawa et al. .................... 310/81     |
| 6,700,250 | B2 | * | 3/2004  | Miyasaka ....................... 310/81      |
| 6,841,905 | B2 | * | 1/2005  | Yamaguchi ..................... 310/81       |
| 7,161,269 | B2 | * | 1/2007  | Kayama et al. ................. 310/81       |
| 2001/0040413 | A1 | * | 11/2001 | Yamaguchi ..................... 310/81    |
| 2010/0084943 | A1 | * | 4/2010  | Mizukami et al. ............. 310/221      |

FOREIGN PATENT DOCUMENTS

| JP | 63-10765 U   | 1/1988  |
| JP | 10-97375     | 4/1998  |
| JP | 2003-333796  | 11/2003 |
| JP | 2005-28331   | 2/2005  |

(Continued)

OTHER PUBLICATIONS

Machine Translation JP 2006-115564A.*

(Continued)

*Primary Examiner* — Dang Le
(74) *Attorney, Agent, or Firm* — Beyer Law Group LLP

(57) ABSTRACT

A vibration motor includes: a core pivotally supported on a shaft; a commutator for supplying electric current to a coil; a commutator holder having through holes extending in an axial direction of the shaft; and chip type varistors fitted into the through holes. The commutator is provided with conductors extending in the axial direction of the shaft, and the conductors are inserted into the through holes and press-fixed to end electrodes of the chip type varistors. A first protrusion is provided on a first wall surface forming each through hole, and a second protrusion facing the first protrusion is provided on a second wall surface.

16 Claims, 13 Drawing Sheets

(56) References Cited

FOREIGN PATENT DOCUMENTS

| | | | |
|---|---|---|---|
| JP | 2005-51963 | | 2/2005 |
| JP | 2006-115564 | | 4/2006 |
| JP | 2006115564 A | * | 4/2006 |
| JP | 2007-27446 | | 2/2007 |
| JP | 2007174808 A | * | 6/2007 |

OTHER PUBLICATIONS

Machine Translation JP 2007-174808A.*

* cited by examiner

MOTOR

TECHNICAL FIELD

The present invention relates to a motor that is embedded in various types of portable communication devices (e.g., mobile phones), portable information terminal devices, entertainment devices (e.g., personal digital assistants (PDAs), etc and used as, for example, a vibration generating source.

BACKGROUND ART

Prior art in this field includes Japanese Unexamined Utility Model Publication No. Sho 63-10765. A small motor disclosed in this publication comprises a chip type varistor electrically connected to a commutator, a commutator holder for holding the commutator, and a securing ring for securing the commutator to the commutator holder. A concave portion for fitting the chip type varistor therein is provided at a base portion of the commutator holder. As the chip type varistor is inserted into the concave portion, the thickness of the motor is made smaller, thus contributing to the thinning of the motor.

Also, a small motor disclosed in Japanese Unexamined Patent Application Publication No. 2006-115564 comprises a core supported on a shaft, a commutator electrically connected to a coil wound around the core, a brush slidably contacting with the commutator, and an annular varistor supported on the shaft. As the varistor is provided on the opposite side of the brush with the core interposed therebetween, the thickness of the motor case is made smaller, thus contributing to the thinning of the motor.

DISCLOSURE OF THE INVENTION

Problems to be Solved

Recently, as portable communication devices, etc. have become smaller, there is an increasing demand for thinning of vibration motors used therein. However, in the small motor disclosed in Japanese Unexamined Utility Model Publication No. Sho 63-10765, the base portion of the commutator holder and the chip type varistor are stacked over each other in the thickness direction of the motor, and thus a space for accommodating both of them is required. As a result, there is a limit in making the thickness of the motor smaller, and there is a problem in which it is difficult to further thin the motor.

Also, in the small motor disclosed in Japanese Unexamined Patent Application Publication No. 2006-115564, a securing ring of the commutator and the commutator are stacked over each other in the thickness direction of the motor, and a terminal electrically connected to the brush extends outward. Thus, there is a limit in making the thickness of the motor smaller, and there is a problem in which it is difficult to further thin the motor.

It is an object of the present invention to provide a vibration motor that can be thinned.

Means for Solving the Problems

A motor according to the present invention includes: a core pivotally supported on a shaft; a commutator for supplying electric current to a coil wound around the core; a commutator holder for holding the commutator and having a through hole extending in an axial direction of the shaft; and a chip type varistor fitted into the through holes, wherein the commutator is provided with conductors extending in the axial direction of the shaft, and the conductors are inserted into the through holes and press-contacted to an end electrode of the chip type varistor.

In the motor according to the present invention, the through hole extending in the axial direction of the shaft is provided in the commutator holder and the chip type varistor is fitted into the through holes, so there is no impact of the chip type varistor on the thickness of the motor. As such, there is no need to consider the impact of the chip type varistor on the thickness of the motor, and therefore the thickness of the motor can be easily made smaller, thus contributing to the thinning of the motor. Moreover, the conductors are inserted into the through hole and press-contacted to the end electrode of the chip type varistor, so that the conductors and the end electrodes are electrically connected by one touch operation, thus ensuring a stable conduction state between the end electrodes and the conductors.

In the motor according to the present invention, it is preferable that a first protrusion extending in the axial direction between the two inserted conductors is provided on a first wall surface forming each of the through holes.

In this case, the first protrusion guides the conductors inserted into the through hole and crimps the conductors to the end electrodes of each chip type varistor, thus ensuring a stable conduction state between both of them.

In the motor according to the present invention, it is preferable that a second protrusion facing the first protrusion is further provided on a second wall surface facing the first wall surface.

In this case, the chip type varistor fitted into the through hole is pressed to the first protrusion by the second protrusion, so that the chip type varistor is securely fixed within the through hole, and the end electrodes of the chip type varistor are securely press-fixed to the conductors. Accordingly, a stable conduction state can be attained between both of them.

Furthermore, a motor according to the present invention includes: a flat core; a commutator having riser portions extending in parallel with the plane of the core; brushes disposed on opposite sides of the riser portions with the core interposed therebetween and slidably contacting with the commutator; a flat outer cylindrical portion receiving the core, the commutator, and the brushes and opened at one side; a cover for blocking the open side of the outer cylindrical portion; a back yoke disposed along the inner peripheral surface of the outer cylindrical portion; and a ring-shaped magnet fixed to the inner peripheral surface through the back yoke, wherein the outer cylindrical portion is formed from a non-magnetic material.

In the motor according to the present invention, the riser portions of the commutator are disposed on opposite sides of the brushes with the core interposed therebetween and extend in parallel to a surface of the core, so that a space for accommodating the riser portions in the thickness direction of the outer cylindrical portion of the motor can be made smaller. Accordingly, the thickness of the outer cylindrical portion can be made smaller, thus contributing to the thinning of the motor. In addition, a magnetic circuit can be efficiently formed by the magnet and the back yoke because the magnet is fixed to the inner peripheral surface of the outer cylindrical portion through the back yoke. Besides, the outer cylindrical portion can prevent leakage of magnetic flux without fail since the outer cylindrical portion is formed from a non-magnetic material. As a result, it is possible to increase the torque of the motor by making efficient use of the magnetic flux of the magnet. This configuration is most preferable in thinning the vibration motor.

In the motor according to the present invention, both ends of the back yoke having a band shape are spaced apart and closely situated from each other, and the gap therebetween is disposed at 90° from a magnetic wall of the magnet.

In this case, the gap of the back yoke is disposed at 90° from the magnetic wall of the magnet, so a magnetic circuit can be efficiently formed.

In the motor according to the present invention, it is preferable that the core is formed from one silicon steel plate.

In this case, the core is easier to manufacture, as compared to a core formed by laminating a plurality of silicon steel plates. Besides, it is easy to control the dimensions of the core since there is no increase in the thickness of the core caused by the coating of the silicon steel plate, and it becomes much easier to thin the motor.

The motor according to the present invention further includes: a circuit board buried in the cover; and terminals secured to the brushes. Preferably, the bottom surface of the circuit board is exposed, the cover is provided with through holes for exposing the top surface of the circuit board, and the terminals are disposed within the through holes and electrically connected to the circuit board by soldering.

In this case, there is no impact of the thickness of the circuit board on the thickness of the outer cylindrical portion since the circuit board is buried in the cover. In addition, there is no impact of the terminals on the thickness of the outer cylindrical portion since the cover is provided with through holes for exposing the top surface of the circuit board and the terminals are disposed within the through holes. As a result, the thickness of the outer cylindrical portion can be made smaller, so it is much easier to thin the motor. Additionally, the assembling workability of the motor can be improved because the terminals are electrically connected to the circuit board by soldering. Further, it is much easier to electrically connect the vibration motor to a portable communication device, etc since the bottom surface of the circuit board is exposed.

In the motor according to the present invention, it is preferable that a weight is fitted into a slot of the core.

In this case, the impact of the thickness of the weight on the thickness of the outer cylindrical portion can be suppressed, thereby making it easier to thin the motor.

Effects of the Invention

According to the present invention, there is provided a motor that can be thinned.

BRIEF DESCRIPTIONS OF THE DRAWINGS

DESCRIPTIONS OF REFERENCE NUMERALS

1 . . . vibration motor,
4 . . . shaft,
5 . . . core,
12 . . . coil,
13 . . . commutator,
14 . . . commutator holder,
15b . . . through hole,
15c . . . first wall surface,
15e . . . second wall surface,
15d . . . first protrusion,
15f . . . second protrusion,
16c, 16d . . . conductor,
18 . . . chip type varistor,
18b, 18c . . . end electrode,
L . . . axial line.

DESCRIPTIONS OF EXEMPLARY EMBODIMENTS

Hereinafter, a motor according to a preferred embodiment of the present invention will be described in detail.

Figure 1:
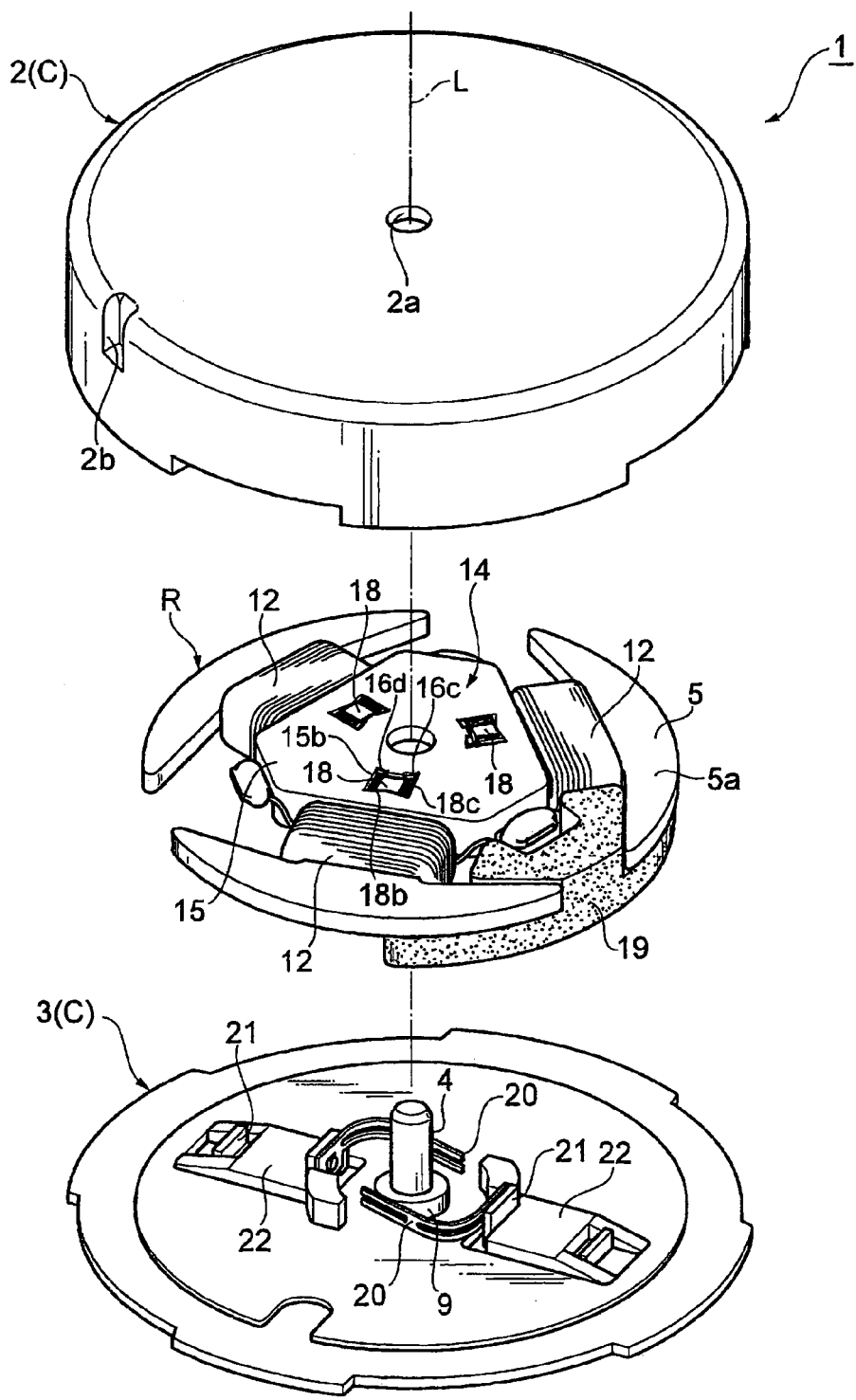
FIG. 1 is an exploded perspective view showing a vibration motor according to one embodiment of the present invention.
Figure 2:
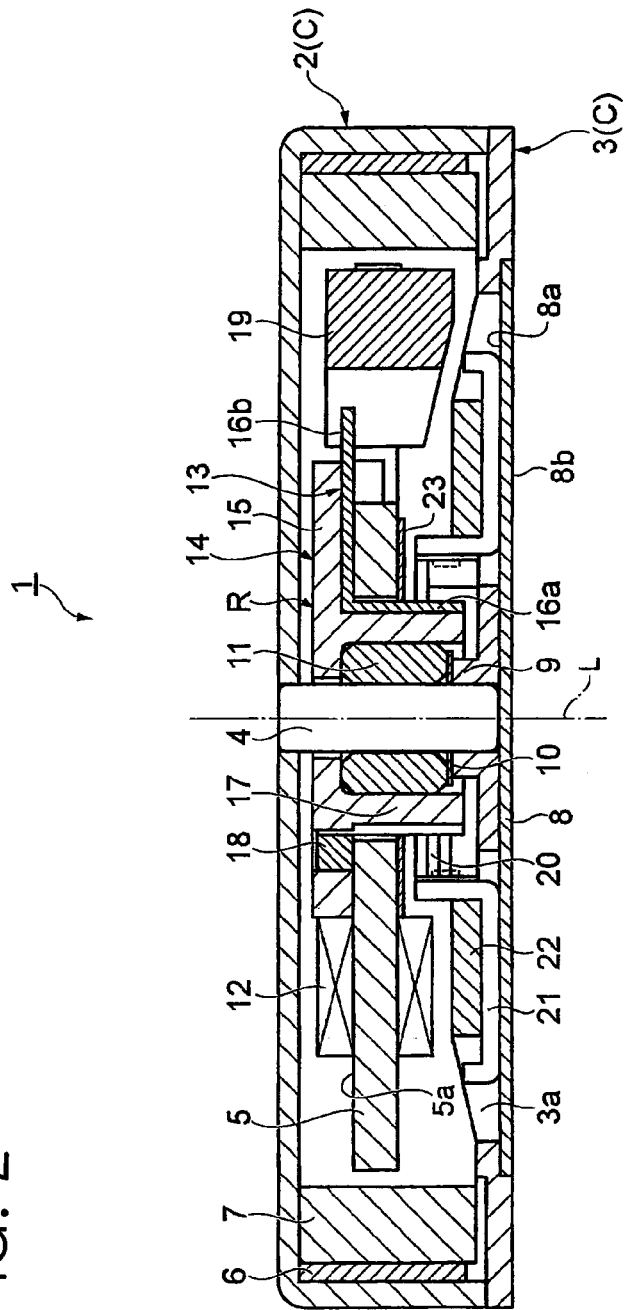
FIG. 2 is a cross-sectional view of the vibration motor shown in FIG. 1.

As shown in FIGS. 1 and 2, the motor is a two-pole and three-slot type vibration motor 1, is made into a small size with a diameter of about 10 mm and a thickness of about 2 mm, and is embedded in a mobile phone etc. and used as a vibration generating source. This vibration motor 1 comprises a motor case C including a flat outer cylindrical portion 2 opened at one side and a bracket 3 (cover) for closing the open side of the outer cylindrical portion 2. In the motor case C, a rotor assembly R having a core 5 is rotatably supported on the shaft 4.

Figure 3:
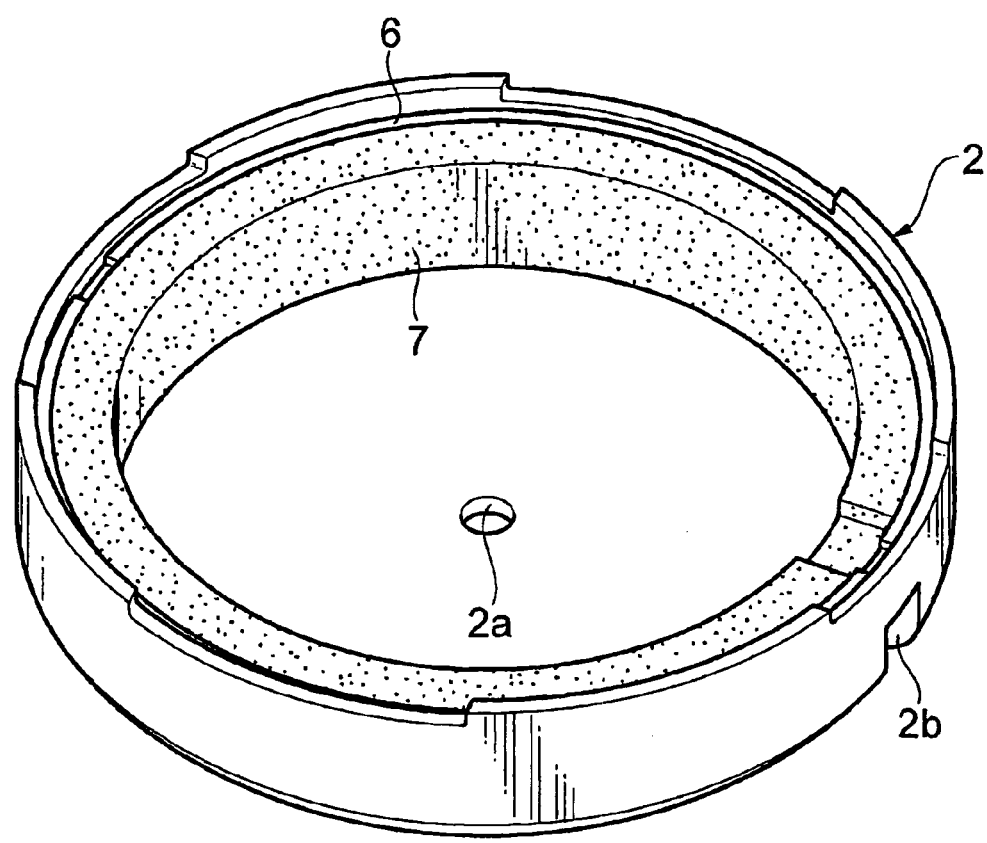
FIG. 3 is a perspective view showing an internal structure of an outer cylindrical portion.
Figure 4:
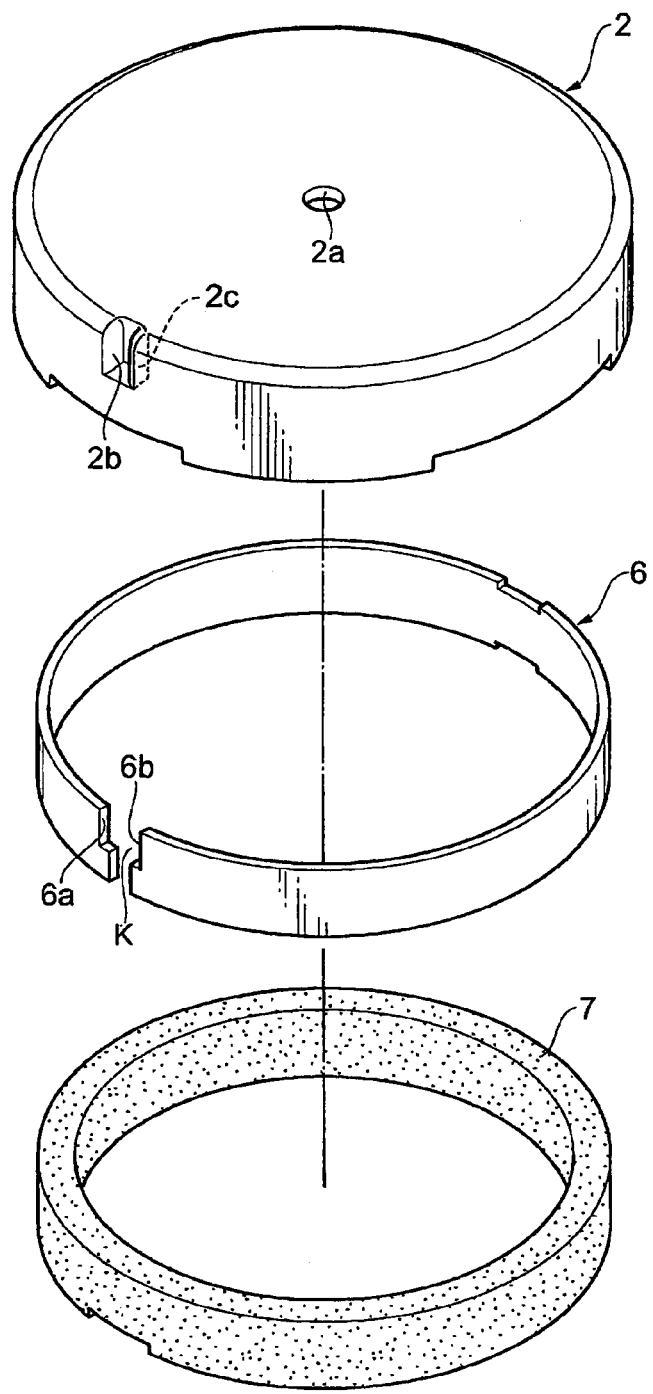
FIG. 4 is an exploded perspective view showing the positional relationship of the outer cylindrical portion, a back yoke, and a magnet.

As shown in FIGS. 3 and 4, the outer cylindrical portion 2 is formed from a non-magnetic material such as stainless steel, and a circular hole 2a is provided at the center thereof to insert the front end of the shaft 4 therein. A concave portion 2b is formed on the outer peripheral wall of the outer cylindrical portion 2 by pressing the outer peripheral wall inwardly, and a convex portion 2c is formed corresponding to the concave portion 2b on the inner peripheral wall of the outer cylindrical portion 2.

Figure 5:
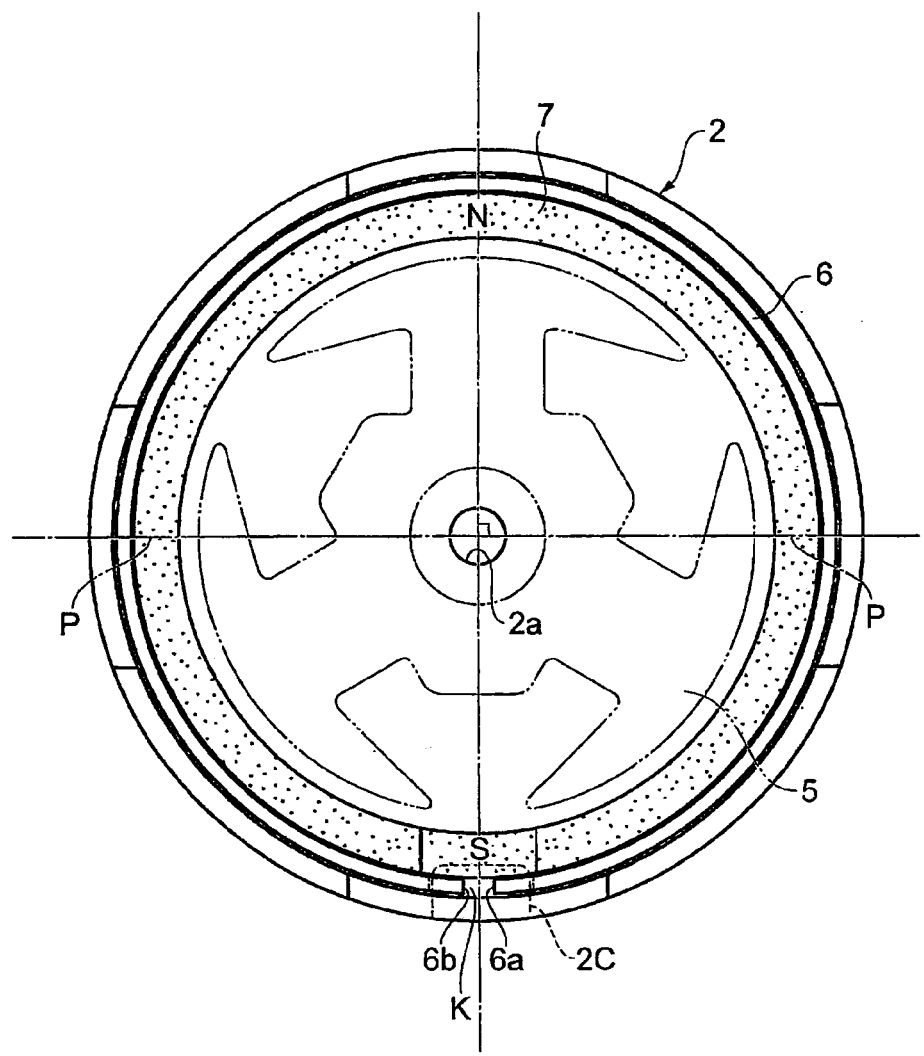
FIG. 5 is a top plan view showing the positional relationship of the outer cylindrical portion, the back yoke, and the magnet.

A ring-shaped magnet 7 is fixed to the inner peripheral surface of the outer cylindrical portion 2 through a band-shaped back yoke 6. The back yoke 6 is formed from a soft magnetic material, with its both ends 6a and 6b spaced apart and closely situated from each other, and has a C-shape. As shown in FIG. 5, a gap K between the two ends 6a and 6b is disposed at 90° (i.e., at the center of the S pole) from a magnetic wall P of the magnet 7. Here, the magnetic wall P refers to the boundary between the N pole and S pole of the magnet 7. As such, the outer cylindrical portion 2 formed from a non-magnetic material can prevent leakage of magnetic flux without fail. The gap between the two ends 6a and 6b is disposed at 90° from the magnetic wall P of the magnet 7, so a magnetic circuit can be efficiently formed.

Both ends 6a and 6b of the back yoke 6 face each other and are formed in a stepped shape so that the gap K between the two ends 6a and 6b is wider in an upper region than in a lower region. The convex portion 2c of the outer cylindrical portion 2 is inserted into the upper region.

As shown in FIG. 1, the bracket 3 is formed from a non-magnetic metal and has an approximately disc-like shape, and a cylindrical shaft holder 9 integrally formed with the bracket 3 is stood and provided at the center of the bracket 3. The shaft 4 is press-fixed and fixed into the shaft holder 9. A washer 10 and a bearing 11 are disposed upward of the shaft holder 9, and the rotor assembly R is rotatably supported on the shaft 4 through the bearing 11 (see FIG. 2).

Figure 6:
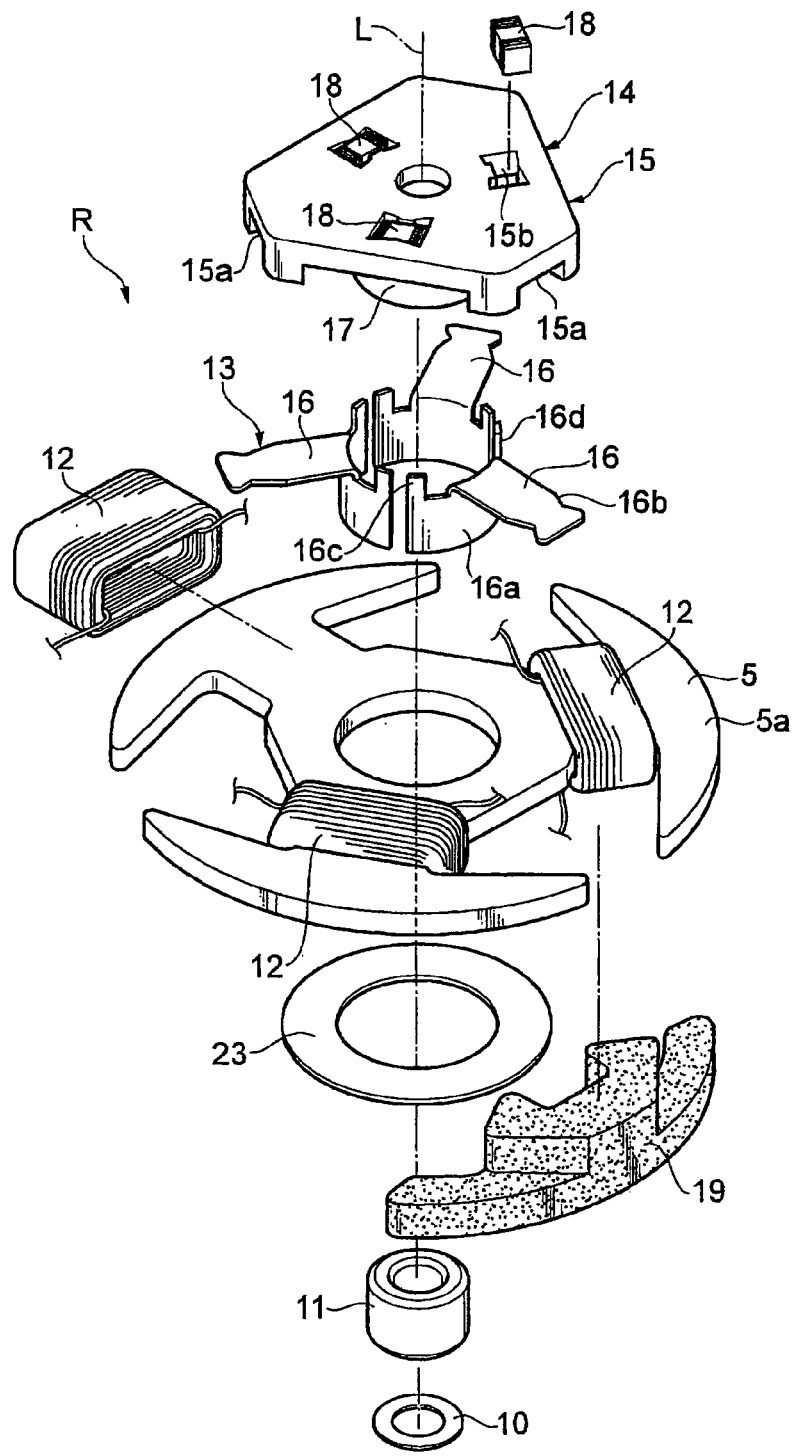
FIG. 6 is an exploded perspective view showing a rotor assembly.

The rotor assembly R mainly comprises a core 5 around which a coil 12 is wound, a commutator 13 for supplying electric current to the coil 12, and a commutator holder 14 for holding the commutator 13 (see FIG. 6). The core 5 is of a two pole and three slot type and has a flat shape, and is punched out of a silicon steel plate having a thickness of 0.35 mm. Also, a weight 19 made of a high specific gravity metal, such as tungsten, is fitted into one of the three slots. Since the weight 19 is disposed in the slot of the core 5, the impact of the thickness of the weight 19 on the thickness of the motor case C can be suppressed, thereby making it easier to thin the vibration motor 1. Moreover, if the weight 19 is made to extend in a circumferential direction on the side of commutator 13 of the core 5, a space outside the diameter of brushes 20 to be described later can be used efficiently, thus increasing vibrations of the vibration motor 1 and making the vibration motor 1 thinned.

The commutator 13 has three commutator segments 16 made out of a thin plate of copper by press molding. Each commutator segment 16 comprises a main body 16a extending along the axial (L) direction of the shaft 4 and having a circular arc-shaped cross section and a riser portion 16b raised from an end of the main body 16a and extending in parallel with the plane 5a of the core 5. The wire of the coil 12 is wound around the front end of the riser portion 16b, and soldered thereto (see FIG. 1). Moreover, the commutator segment 16 is provided with rod-shaped conductors 16c and 16d formed integrally with the main body 16a and protruding from ends of the main body 16a. The conductors 16c and 16d extend in an axial (L) direction of the shaft 4, and are left and right symmetrical with respect to the riser portion 16b. Moreover, each commutator segment 16 is secured to the commutator holder 14 by press-fitting a securing ring 23 into the main body 16a.

Figure 7:
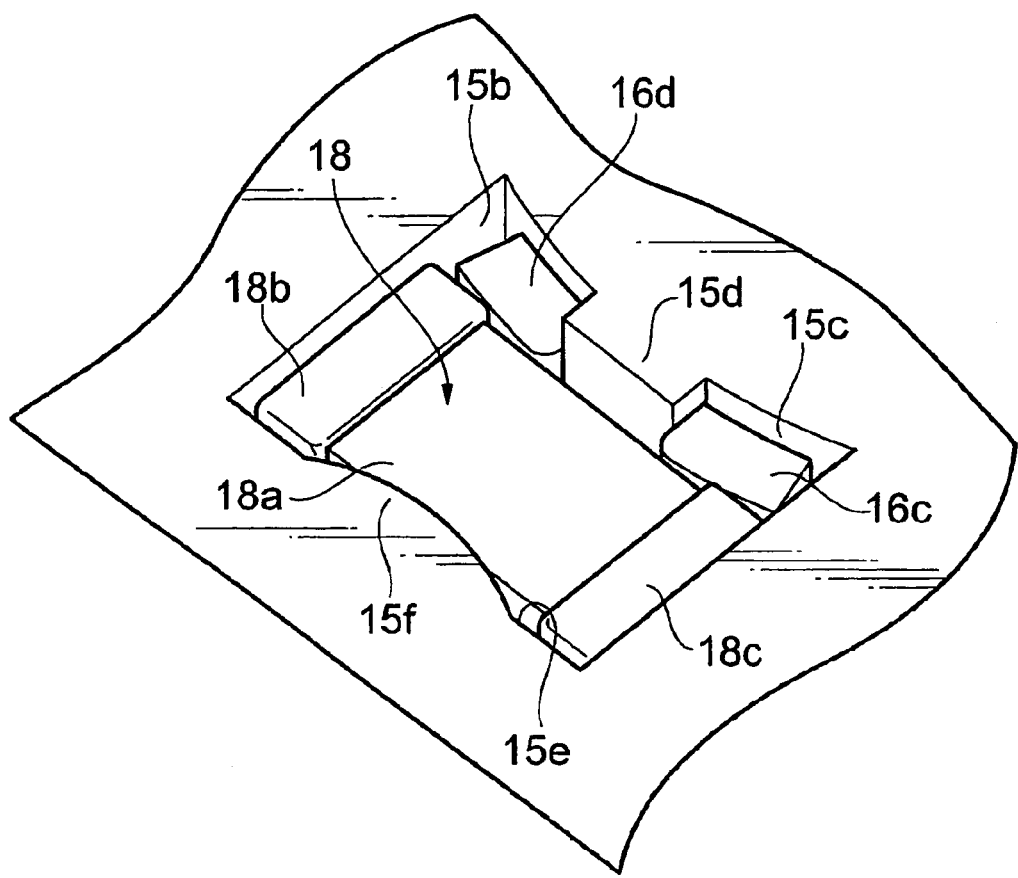
FIG. 7 is an enlarged view of a through hole of the vibration motor shown in FIG. 1.

Three through holes 15b are provided in the commutator holder 14, and chip type varistors 18 for preventing spark and noise generation are respectively fitted therein. Each chip type varistor 18 comprises an approximately rectangular parallelepiped laminated body 18a and a pair of end electrodes 18b and 18c formed on both longitudinal cross sections of the laminated body 18a. As shown in FIG. 7, the conductors 16c and 16d of the commutator segment 16 are inserted into the through hole 15b, and are respectively press-contacted to the end electrodes 18b and 18c of the varistor 18 and electrically connected thereto.

Figure 8:
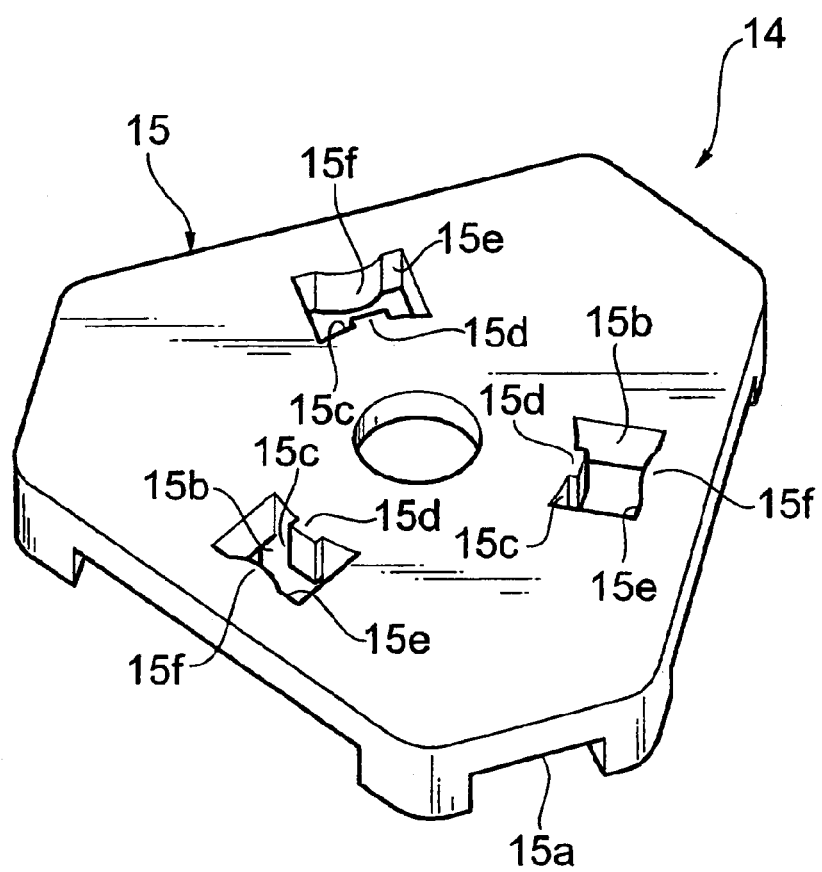
FIG. 8 is a perspective view showing a commutator holder.
Figure 9:
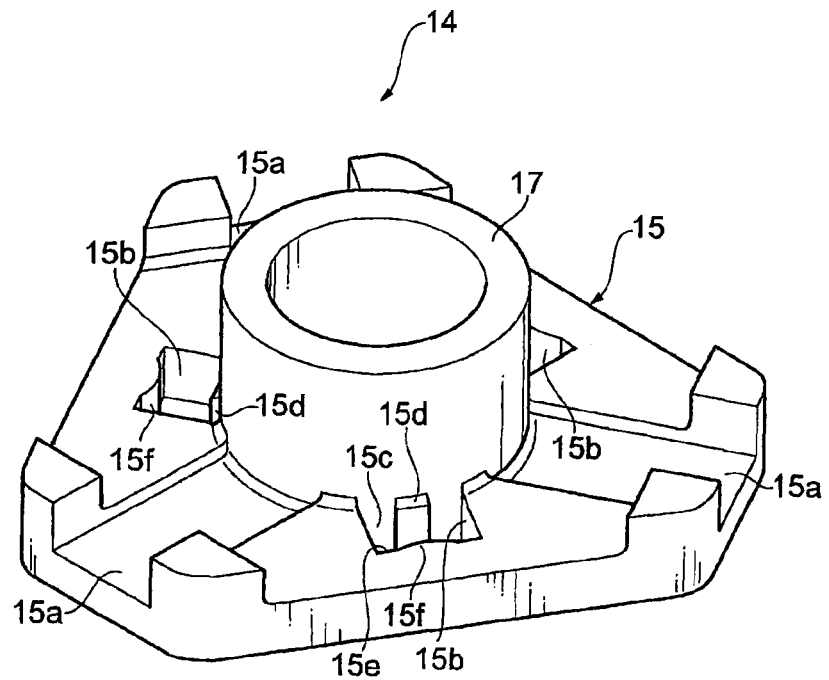
FIG. 9 is a perspective view showing the commutator holder.

As shown in FIGS. 8 and 9, the commutator holder 14 has an approximately triangular base portion 15 and a cylindrical portion 17 stood at the center of the base portion 15. Three grooves 15a extending outward from the cylindrical portion 17 are formed in the base portion 15. The riser portions 16b of the commutator 13 are received in the grooves 15a. The through holes 15b are respectively provided near the base of the cylindrical portion 17 between the adjacent ones of the three grooves 15a. The through holes 15b extend in the axial (L) direction of the shaft 4 and are disposed at equal intervals on the circumference around the cylindrical portion 17.

A first protrusion 15d protruding outward along the diameter direction of the cylindrical portion 17 from a first wall surface 15c is provided on the first wall surface 15c forming each of the through holes 15b. The first protrusion 15d has a rectangular shape, is disposed at the center of the first wall surface 15c, and extends in the axial (L) direction of the shaft 4. The protruding length of the first protrusion 15d from the first wall surface 15c is smaller than the thickness of the conductors 16c and 16d. As such, the provision of the first protrusion 15d does not inhibit the contact between the conductors 16c and 16d and the end electrodes 18b and 18c. Accordingly, the first protrusion 15d, provided between the adjacent conductors 16c and 16d inserted in the through holes 15b, guides the conductors 16c and 16d and crimps the conductors 16c and 16d to the end electrodes 18b and 18c of the chip type varistor 18, so that the conductors 16c and 16d and the end electrodes 18b and 18c are electrically connected by one touch operation, thus ensuring a stable conduction state between both of them.

A second protrusion 15f protruding inward along the diameter direction of the cylindrical portion 17 from a second wall surface 15e is provided on the second wall surface 15e facing the first wall surface 15c. The second protrusion 15f has a circular arc shape, and faces the first protrusion 15d. the second protrusion 15f is in direct contact with the laminated body 18a of the chip type varistor 18 fitted into the through hole 15b, and the chip type varistor 18 is pressed to the conductors 16c and 16d to bring both of them into close contact with each other. Accordingly, the chip type varistor 18 is securely fixed within the through hole 15b, and the end electrodes 18b and 18c are securely press-contacted to the conductors 16c and 16d, thus ensuring a stable conduction state between the end electrodes 18b and 18c and the conductors 16c and 16d.

As such, since the end electrodes 18b and 18c are securely press-contacted to the conductors 16c and 16d, an operation of connecting both of them by soldering can be omitted. As a result, the assembling workability of the vibration motor 1 can be improved, and cost reduction can be achieved. Even if the end electrodes 18b and 18c and the conductors 16c and 16 are to be connected by soldering, since both of them are closely contacted with each other, the soldering operation can be easily performed and the workability can be improved.

Figure 10:
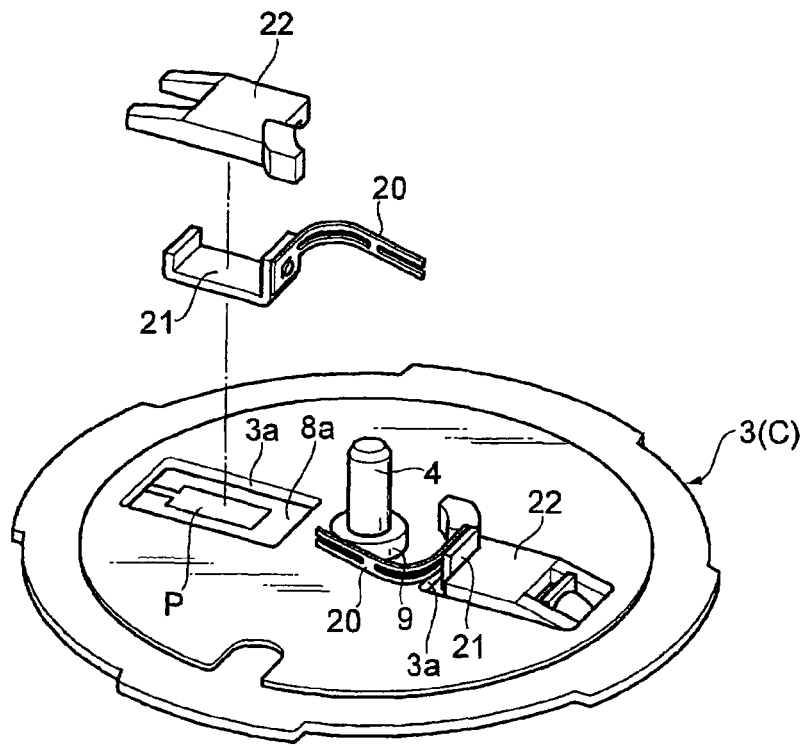
FIG. 10 is an exploded perspective view showing the positional relationship of a bracket, terminals, and brush holders.
Figure 11:
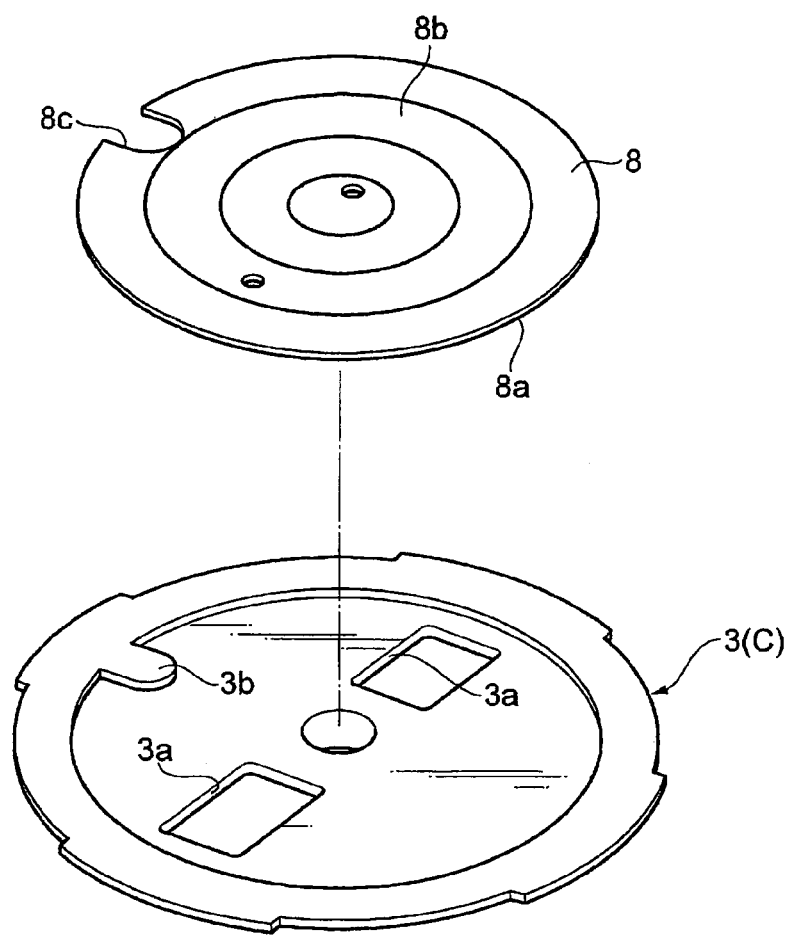
FIG. 11 is an exploded perspective view showing the positional relationship between the bracket and a circuit board.

As shown in FIGS. 1, 10, and 11, a pair of brushes 20 slidably contacting with the commutator segments 16 are disposed on the upper surface of the bracket 3. The pair of brushes 20 are disposed on opposite sides of the riser portions 16b of the commutator segments 16 with the core 5 interposed therebetween (see FIG. 2). A circuit board 8 having feeding electrodes disposed thereon is buried in the center of the bracket 3. As such, there is no impact of the thickness of the circuit board 8 on the thickness of the vibration motor 1 since the circuit board 8 is buried in the bracket 3, thus making it much easier to thin the vibration motor 1.

The circuit board 8 has a disc shape, and is surrounded by the bracket 3, and its top surface 8a is covered by the bracket 3 and its bottom surface 8b is exposed from the bracket 3. As such, connection between the circuit board 8 and an external wiring substrate can be easily carried out by exposing the bottom surface 8b of the circuit board 8, and therefore the vibration motor 1 can be easily assembled into a portable communication device, etc. Also, a cutout portion 8c is provided on the circuit board 8, and a protrusion 3b corresponding to the cutout portion 8c is installed on the bracket 3. Accordingly, when attaching the circuit board 8 to the bracket 3, their positions can be easily determined, and the rotation of the attached circuit board 8 can be prevented.

As shown in FIG. 10, two through holes 3a for exposing part of the top surface 8a of the circuit board 8 are provided in the bracket 3. The through holes 3a have a rectangular shape and are left and right symmetrical with respect to the central axis of the shaft 4, and terminals 21 secured to the brushes 20 are received in the through holes 3a. The terminals 21 are electrically connected to electrode patterns P of the circuit board 8 by soldering, and pressed to the circuit board 8 by terminal holders 22. The terminal holders 22 are secured to the bracket 3 by bonding, etc.

In the thus-constructed vibration motor 1, the through holes 15b extending in the axial (L) direction of the shaft 4 are provided in the commutator holder 14, and the chip type varistors 18 are fitted into the through holes 15b, so there is no impact of the thickness of the chip type varistors 18 on the thickness of the vibration motor 1. As such, there is no need to consider the impact of the chip type varistors 18 on the thickness of the vibration motor 1, and therefore the thickness of the vibration motor 1 can be easily made smaller, thus contributing to the thinning of the vibration motor 1. Moreover, the conductors 16c and 16d inserted into each through hole 15b and the end electrodes 18b and 18c of each chip type varistor 18 fitted therein are securely press-contacted to each other in cooperation with the first protrusion 15d and the second protrusion 15f, thus ensuring a stable conduction state between the end electrodes 18b and 18c and the conductors 16c and 16d.

Further, the riser portions 16b of the commutator segments 16 are disposed on opposite sides of the brushes 20 with the core 5 interposed therebetween. Thus, a space as wide as the plate thickness of the riser portions 16b is obtained to accommodate the riser portions 16b in the thickness direction of the motor case C. Accordingly, the thickness of the motor case C can be made smaller, thus contributing to the thinning of the vibration motor 1.

In addition, a magnetic circuit can be efficiently formed by the magnet 7 and the back yoke 6 because the magnet 7 is fixed to the inner peripheral surface of the outer cylindrical portion 2 through the back yoke 6. Besides, the outer cylindrical portion 2 can prevent leakage of magnetic flux without fail since the outer cylindrical portion 2 is formed from a non-magnetic material. As a result, it is possible to increase the torque of the vibration motor 1 by making efficient use of the magnetic flux of the magnet 7. This configuration is most preferable in thinning the vibration motor 1.

Moreover, since the circuit board 8 is buried in the bracket 3, there is no impact of the thickness of the circuit board 8 on the thickness of the motor case C. In addition, the through holes 3a for exposing the top surface 8a of the circuit board 8 are provided in the bracket 3, and the terminals 21 connected to the brushes 21 are disposed within the through holes 3a, thereby suppressing the impact of the terminals 21 on the thickness of the motor case C. Accordingly, the thickness of the motor case C can be made smaller, so it is much easier to thin the vibration motor 1. Additionally, the terminals 21 are electrically connected to an electrode pattern T of the circuit board 8 by soldering, and thus the assembling workability of the vibration motor 1 can be improved.

Further, the core 5 is easier to manufacture, as compared to a core formed by laminating a plurality of silicon steel plates, because the core 5 is formed from one silicon steel plate. Besides, it is easy to control the dimensions of the core 5 since there is no increase in the thickness of the core caused by the coating of the silicon steel plate. As a result, it becomes much easier to thin the vibration motor 1.

Figure 12:
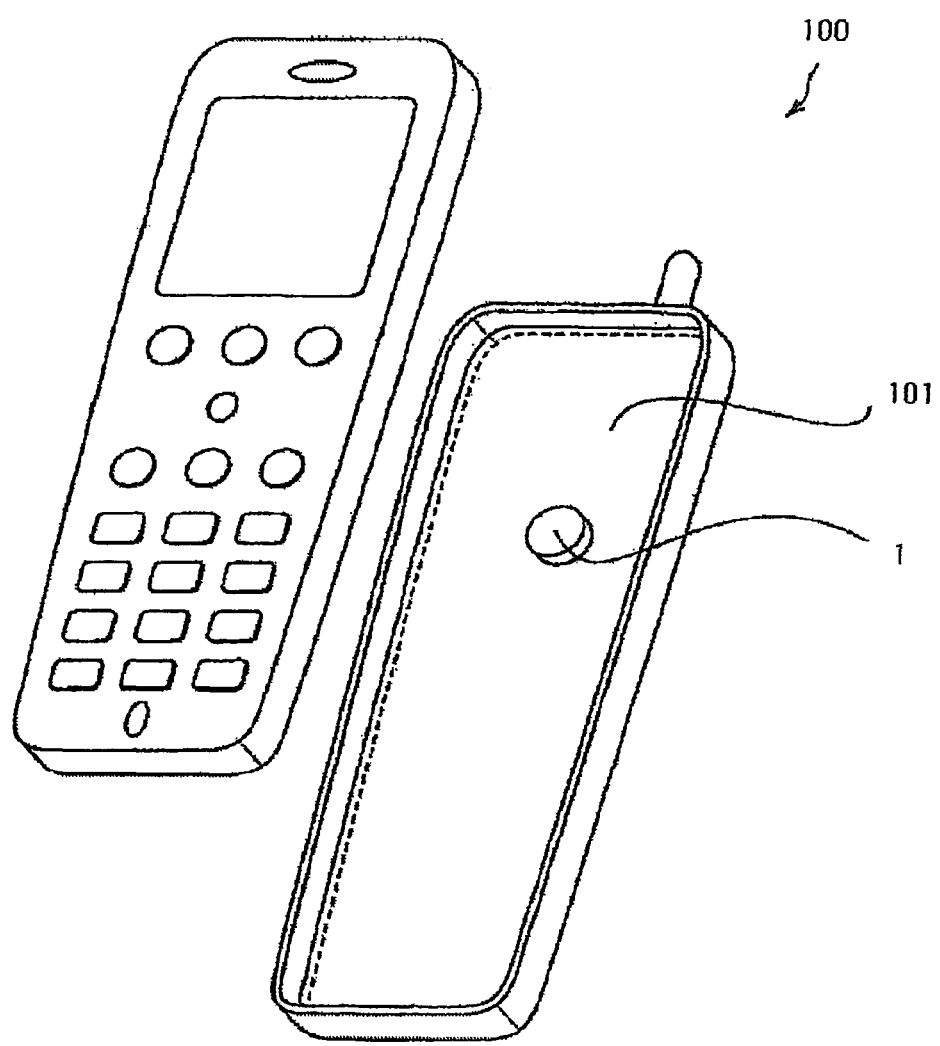
FIG. 12 is a perspective view showing a mobile phone with the motor according to the present invention mounted thereon.
Figure 13:
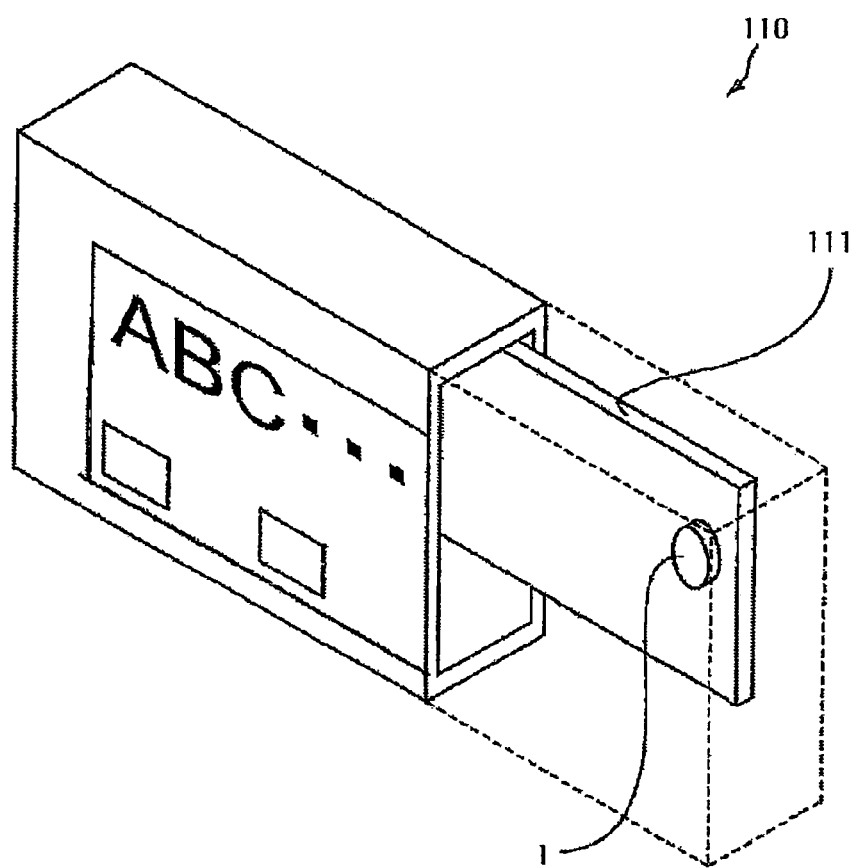
FIG. 13 is a perspective view showing a portable information terminal device with the motor according to the present invention mounted thereon.
Figure 14:
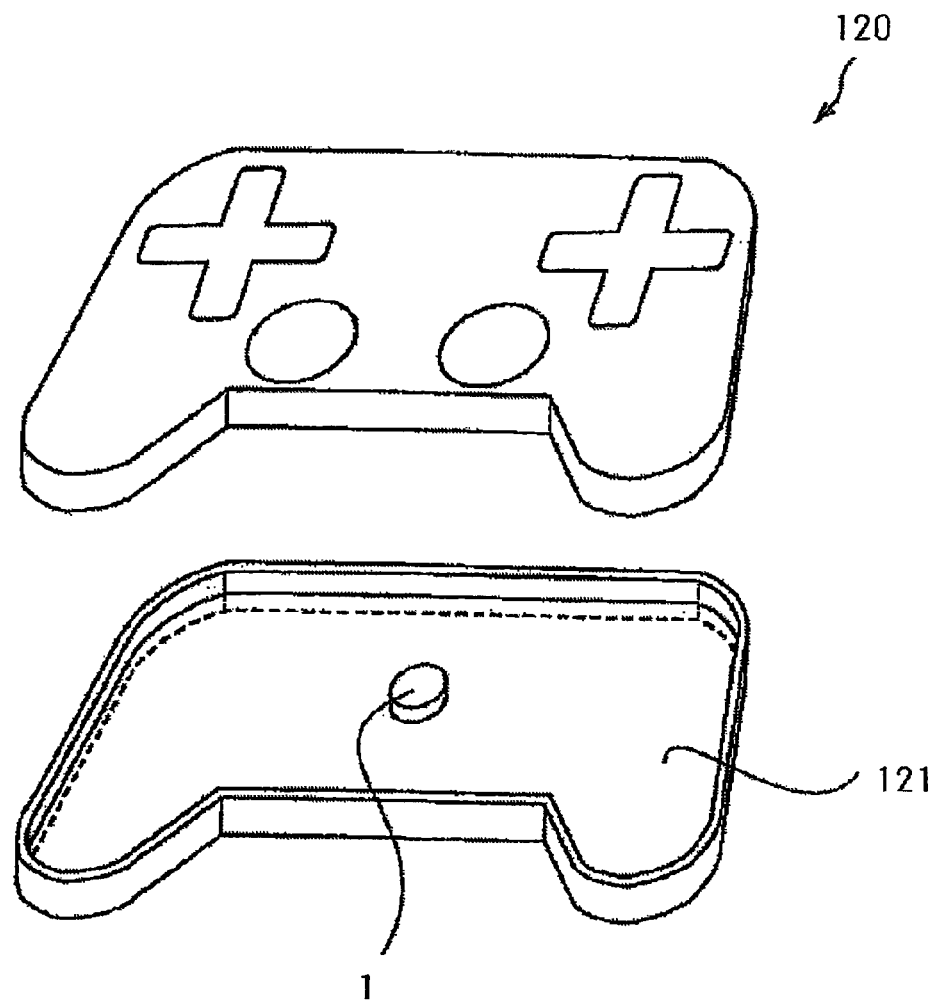
FIG. 14 is a perspective view showing an entertainment device with the motor according to the present invention mounted thereon.

As described above, while the motor according to the embodiment of the present invention has been described in various ways, various types of vibration alarm devices can be formed by mounting the motor according to the present invention thereon, with the weight 19 fitted into a slot of the core 5. As shown in FIG. 12, a portable communication device with a vibration alarm function can be formed by mounting the motor on a wiring substrate 101 of the portable communication, e.g., a mobile phone 100 and connecting the circuit board 8 of the motor to the wiring substrate 101. Moreover, as shown in FIG. 13, a portable information terminal device with a vibration alarm function can be formed by mounting the motor on a wiring substrate 111 of the portable information terminal, e.g., a PDA or portable digital player and connecting the circuit board 8 of the motor to the wiring substrate 111. Further, as shown in FIG. 14, an entertainment device having a vibration alarm function can be formed by mounting the motor on a wiring substrate 121 of an entertainment device 120, e.g., of the controller of a gaming machine, of the main body of a portable gaming machine, of the handle of a pachinko machine, and so on and connecting the circuit board 8 of the motor to the wiring substrate 121. In these apparatuses, the motor is rotated appropriately to generate vibrations when a call is received, when the terminal is operated, when the operator touches the screen or in accordance with the progress of the game.

The invention claimed is:

1. A motor comprising:
   a core pivotally supported on a shaft;
   a commutator for supplying electric current to a coil wound around the core;
   a commutator holder for holding the commutator and having a through hole extending in an axial direction of the shaft; and
   a chip type varistor fitted into the through hole,
   wherein the commutator is provided with a conductor extending in the axial direction of the shaft, and the conductor is inserted into the through hole and press-contacted to an end electrode of the chip type varistor.

2. The motor according to claim 1, wherein a first protrusion extending in the axial direction between the two inserted conductors is provided on a first wall surface forming the through hole.

3. The motor according to claim 1, wherein a second protrusion facing the first protrusion is provided on a second wall surface facing the first wall surface forming the through hole.

4. The motor according to claim 1, wherein a weight is fitted into a slot of the core.

5. A vibration alarm device comprising the motor according to claim 4 mounted thereon.

6. A portable communication device comprising the motor according to claim 4 mounted thereon.

7. A portable information terminal device comprising the motor according to claim 4 mounted thereon.

8. An entertainment device comprising the motor according to claim 4 mounted thereon.

9. A motor comprising:
   a flat core;
   a commutator having a riser portion extending in parallel with a plane of the core;

a brush disposed on an opposite side of the riser portion with the core interposed therebetween and slidably contacting with the commutator;

a flat outer cylindrical portion which receives the core, the commutator, and the brush and which is opened at one side;

a cover for closing the open side of the outer cylindrical portion;

a back yoke disposed along an inner peripheral surface of the outer cylindrical portion; and a ring-shaped magnet fixed to the inner peripheral surface through the back yoke, wherein the outer cylindrical portion is formed from a non-magnetic material, and wherein opposite ends of the back yoke having a band shape are spaced apart and closely situated from each other, and the gap therebetween is disposed at 90° from a magnetic wall of the magnet.

10. The motor according to claim 9, wherein the core is formed from one silicon steel plate.

11. The motor according to claim 9, wherein a weight is fitted into a slot of the core.

12. A vibration alarm device comprising the motor according to claim 11 mounted thereon.

13. A portable communication device comprising the motor according to claim 11 mounted thereon.

14. A portable information terminal device comprising the motor according to claim 11 mounted thereon.

15. An entertainment device comprising the motor according to claim 11 mounted thereon.

16. A motor comprising:

a flat core;

a commutator having a riser portion extending in parallel with a plane of the core;

a brush disposed on an opposite side of the riser portion with the core interposed therebetween and slidably contacting with the commutator;

a flat outer cylindrical portion which receives the core, the commutator, and the brush and which is opened at one side;

a cover for closing the open side of the outer cylindrical portion;

a back yoke disposed along an inner peripheral surface of the outer cylindrical portion;

a ring-shaped magnet fixed to the inner peripheral surface through the back yoke;

a circuit board buried in the cover; and a terminal secured to the brush, wherein the outer cylindrical portion is formed from a non-magnetic material, and wherein a bottom surface of the circuit board is exposed, the cover is provided with a through hole for exposing a top surface of the circuit board, and the terminal is disposed within the through hole and electrically connected to the circuit board by soldering.

* * * * *